United States Patent [19]

Virsik et al.

[11] Patent Number: 5,249,345
[45] Date of Patent: Oct. 5, 1993

[54] METHOD FOR CUTTING ELONGATED TUBE STOCK

[75] Inventors: Milan Virsik, Adrian; Henry McCarbery, Palmyra, both of Mich.

[73] Assignee: Brazeway, Inc., Adrian, Mich.

[21] Appl. No.: 833,051

[22] Filed: Feb. 10, 1992

[51] Int. Cl.⁵ .................. B26D 3/02; B23D 21/00
[52] U.S. Cl. .................................. 29/413; 29/414; 225/2
[58] Field of Search .................. 29/412, 413, 414; 83/54, 861, 862, 875, 879, 880, 882, 883, 884, 885, 886, 887; 225/1, 2, 94, 3, 4, 95, 96, 100, 101; 428/571, 572

[56] References Cited

U.S. PATENT DOCUMENTS

| | | |
|---|---|---|
| 1,366,063 | 1/1921 | Culhane . |
| 3,233,443 | 2/1966 | Lawson ........................ 72/203 |
| 3,268,137 | 8/1966 | Martin ......................... 225/2 |
| 3,273,433 | 9/1966 | Borzym ........................ 83/54 |
| 3,568,488 | 3/1971 | Franks ......................... 72/68 |
| 3,587,953 | 6/1971 | Stehle et al. ................. 225/2 |
| 3,628,710 | 12/1971 | Stehle et al. ............... 225/96.5 |
| 3,692,219 | 9/1972 | Franks ......................... 225/2 |
| 3,759,627 | 9/1973 | Lange ........................ 225/103 X |
| 4,111,346 | 9/1978 | Bertolette ................... 225/96.5 |
| 4,248,369 | 2/1981 | Clausen ....................... 225/2 |
| 5,133,492 | 7/1992 | Wohrstein et.al. ............ 225/2 X |
| 5,143,268 | 9/1992 | Stroup, Jr. .................. 225/101 X |

FOREIGN PATENT DOCUMENTS 0634865 11/1978 U.S.S.R. .......................... 225/101

Primary Examiner—Timothy V. Eley
Attorney, Agent, or Firm—Krass & Young

[57] ABSTRACT

A method of severing an elongated flat metal tube of the type including upper and lower flat horizontal walls, vertical edge walls and vertical partition walls spaced between the edge walls and interconnecting the upper and lower walls to divide the tube into a series of parallel, generally rectangular, longitudinally extending passages. The tube is cut by forming transverse kerfs in the upper and lower walls of the tube and thereafter exerting a relative pulling force on the tube sections on opposite sides of the plane in which the kerfs have been formed to tear apart the remaining tube material at the severing plane and sever the tube. The kerfs are formed in a two-step broaching operation comprising a first cut in which a narrow generally V-shaped narrow angle kerf is formed and a second cut in which the kerf is widened to provide a wide, generally V-shaped, wide angle kerf.

13 Claims, 6 Drawing Sheets

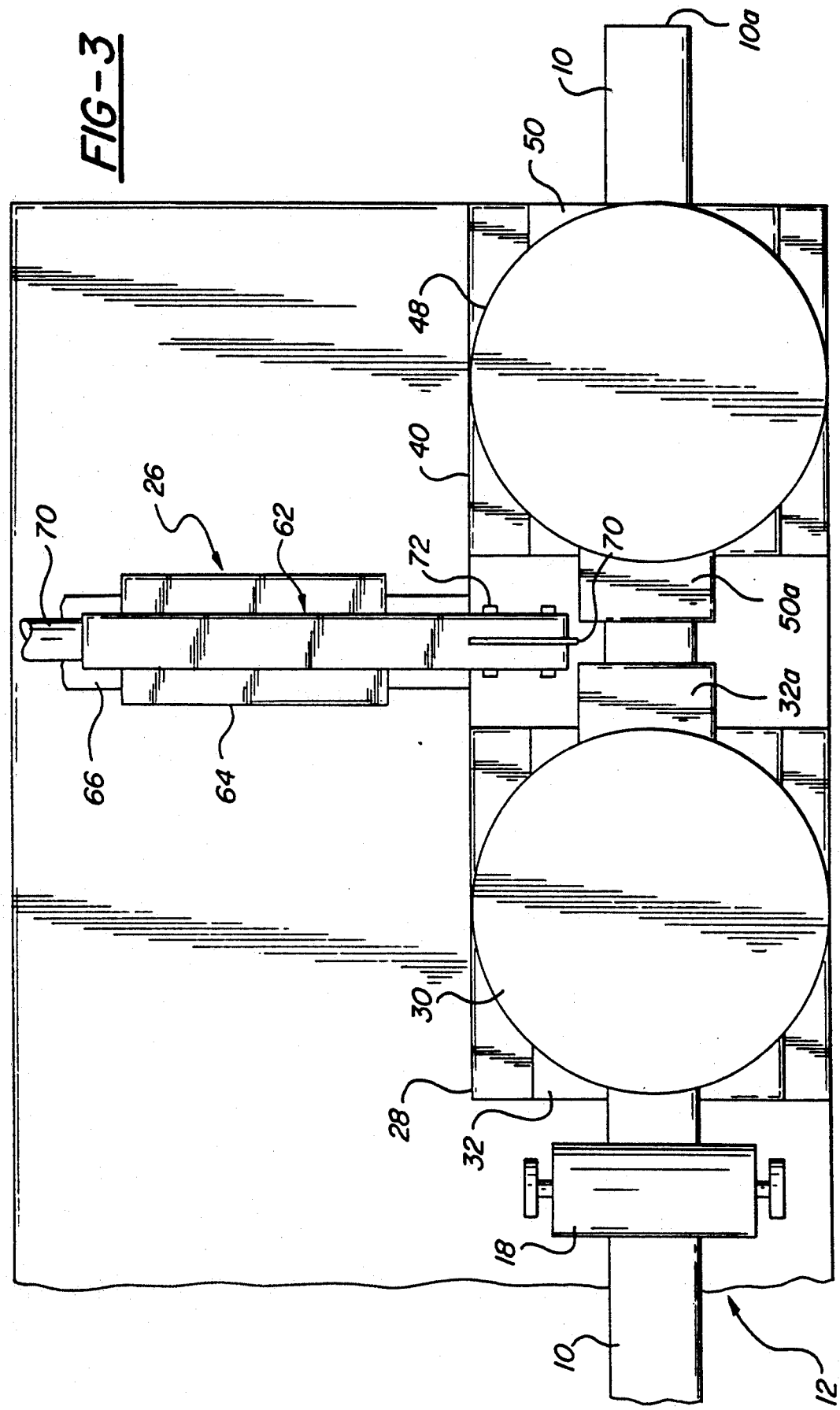

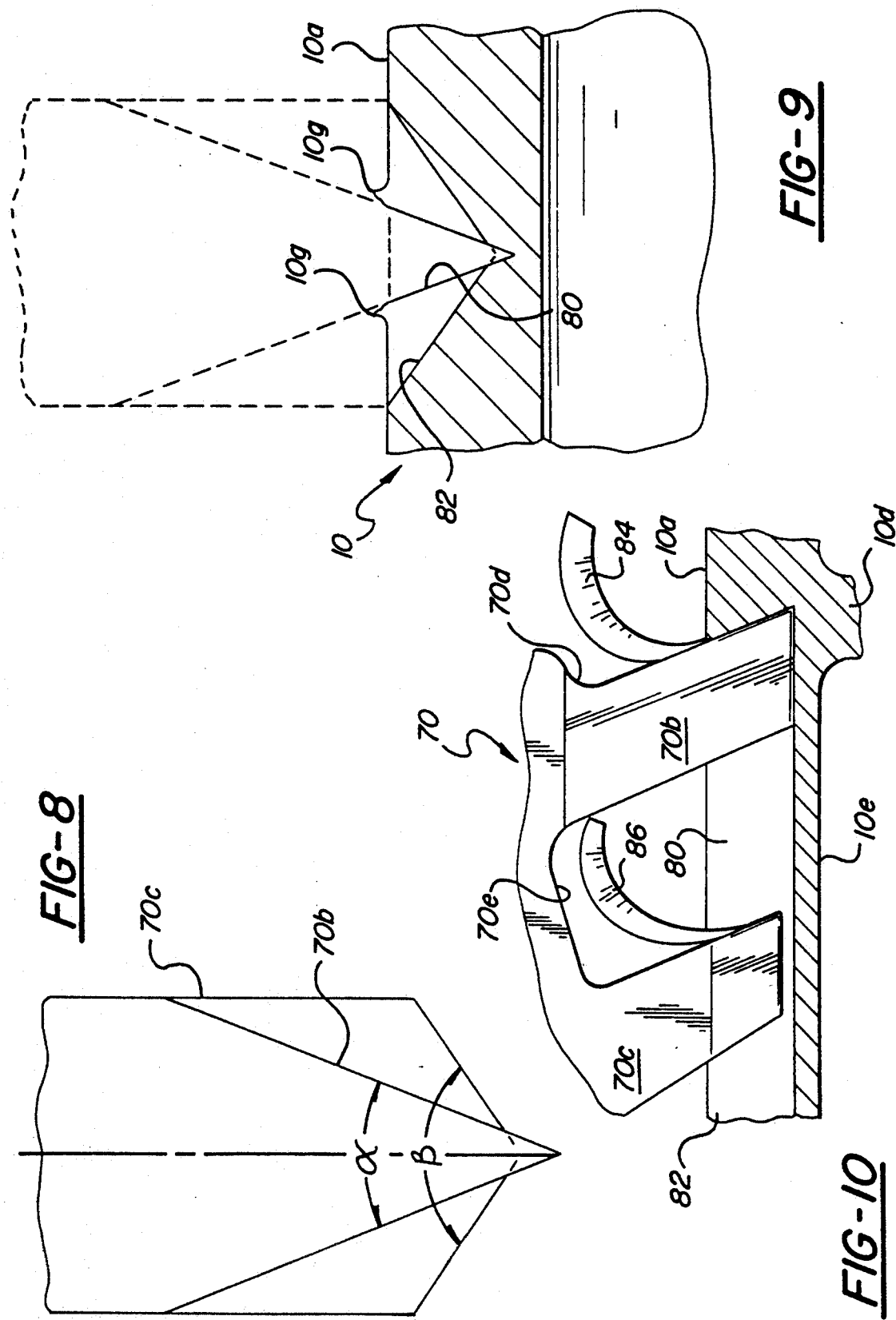

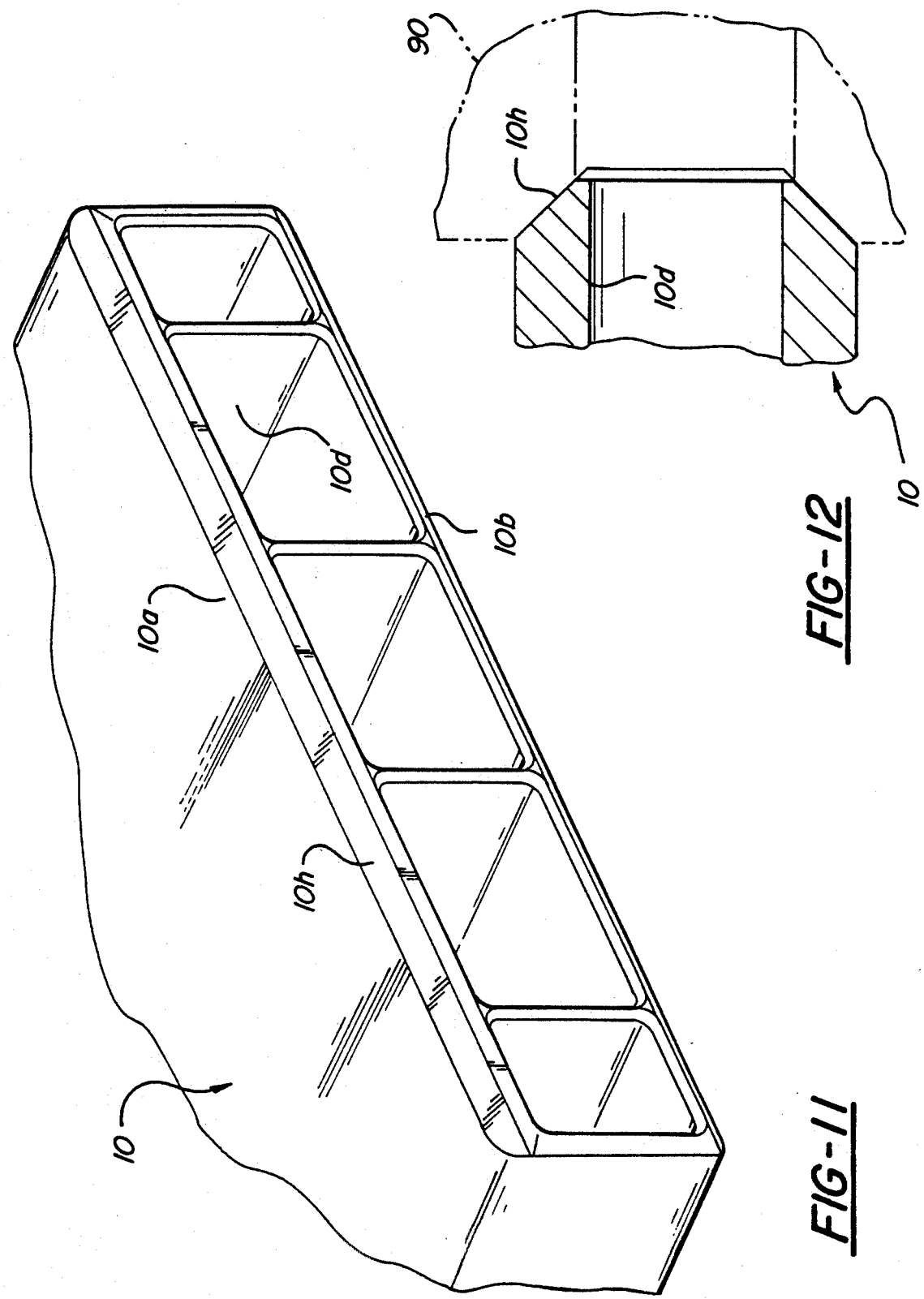

METHOD FOR CUTTING ELONGATED TUBE STOCK

BACKGROUND OF THE INVENTION

This invention relates to a method and apparatus for cutting tubular stock and in particular to a method and apparatus for cutting flat tubular stock of the type defining a series of parallel generally rectangular longitudinally extending passages.

Flat tubular stock defining multiple parallel passages has many industrial applications including the fabrication of condensers for air conditioner systems. In the assembly of a condenser it is necessary to sever the flat tubular stock into a series of tube sections of preselected lengths and, from the standpoint of manufacturing efficiency, it is important that the severing be accomplished in a quick, clean and efficient manner.

In one prior art tube severing method, a score line is rolled across the flat tubing whereafter the tubing is fractured along the score line. Whereas this prior art method is satisfactory for relatively large tubes of sturdy construction, it is unsatisfactory for delicate, thin flat tubing since the rolling operation must be done with a considerable amount of pressure and this pressure results in a partial collapse of the passages of the tubing with the result that a resizing operation must be performed following the severing operation, thereby adding considerably to the cost of manufacturing the associated condenser.

In another prior art tube severing method, a conventional saw is used to cut through the tubing. However, this method also suffers from the disadvantage of requiring a further operation, following the sawing operation, to remove the burrs created by the sawing operation so as to thereby again add considerably to the cost of the associated condenser.

SUMMARY OF THE INVENTION

This invention is directed to the provision of improved method and apparatus for severing flat tubular stock.

More specifically, this invention is directed to the provision of a method and apparatus for severing flat tubular stock to eliminate the necessity for any secondary finishing or resizing operations following the severing operation.

According to the invention methodology, a first transverse kerf is formed in one side of the tube, a second transverse kerf, lying in a common transverse plane with the first kerf, is formed in an opposite side of the tube, and a relative pulling force is exerted on the tube sections on opposite sides of the transverse plane to tear apart the remaining tube material at the plane and sever the tube. This methodology effectively removes a large percentage of the tube material at the cutting plane in the process of forming the kerfs so that a relatively small amount of tube material is actually torn apart in the final pulling operation so as to minimize the formation of burrs or other irregularities at the severed edge of the tube and eliminate the need for any further finishing or resizing operation.

According to a further feature of the invention, the two kerfs are formed simultaneously and the pulling force is exerted after the kerfs have been formed. This specific methodology provides for a precise, positive severing of the tube at the kerf location.

According to a further feature of the invention, the kerfs are formed in a broaching operation. The use of a broaching operation ensures that the material of the tube is cleanly and totally removed in the formation of the kerfs so as to further minimize the amount of material that must be torn apart in the final pulling operation.

According to a further feature of the invention, the broaching operation comprises a first cut in which a narrow, generally V-shaped narrow angle kerf is formed and a second cut in which the kerf is widened to provide a wide generally V-shaped wide angle cut. The first cut establishes the depth and location of the kerf and the second cut removes any burrs formed by the first cut and creates a shallow chamfer to facilitate mounting of the tube section in correspondingly chamfered seats on the header of an associated condenser.

The invention is especially suitable for use with elongated flat metal tube stock of the type having upper and lower flat horizontal walls, vertical end edge walls, and vertical partition walls spaced between the end edge walls and interconnecting the upper and lower walls to divide the tube into a series of parallel, generally rectangular, longitudinally extending passages. In the invention methodology as applied to this specific flat tubular stock, a transverse kerf is formed in the upper wall lying in a transverse plane, a transverse kerf is formed in the lower wall lying in the transverse plane, and relative pulling force is exerted on the tube sections on opposite sides of the transverse plane to tear apart the remaining tube material at the plane and sever the tube.

According to a further feature of the invention methodology, a tube is fed along a longitudinal feed path to position a portion of the tube at a severing station, a first clamp is engaged with the tube at one side of the severing station and a second clamp is engaged with the tube at the other side of the severing station, transverse kerfs are simultaneously formed in the upper and lower walls of the tube at the severing station, and the first and second clamps are thereafter moved longitudinally relatively apart to tear apart the remaining tube material and sever the tube.

In the disclosed embodiment of the invention, each kerf has a depth slightly less than the thickness of the respective upper and lower tube walls so as to leave only a small amount of solid tube material between the base or root of the respective kerf and the adjacent wall surfaces of the passages of the tube. This specific methodology minimizes the amount of material that must be torn apart in the pulling operation and thereby minimizes the burr formation at the severed edge.

The invention apparatus is of the type including means for feeding the stock along a longitudinal feed path to position a portion of the tube at a severing station, means for weakening the tube at the severing station, and means for tearing apart the tube at the weakened location.

According to the invention apparatus, the weakening means comprises a slide mounted at the severing station for transverse movement across the feed path and upper and lower knives mounted on the slide and positioned to form respective kerfs in the upper and lower walls of the flat tubular stock as the slide is moved across the feed path. This specific construction ensures that the majority of the tubular material at the severing station is removed by the knives so that only a minimal amount of tube material is severed by the subsequent tearing apart operation so as to minimize the burr formed at the severed edge.

According to a further feature of the invention apparatus, each knife comprises a broaching knife including a leading tooth, sized to form a narrow, generally V-shaped kerf in the respective tube wall, and a trailing tooth, sized to widen the kerf and provide a wide, generally V-shaped wide angle kerf. This specific knife construction allows the first or leading tooth to establish the depth and location of the kerf in the respective wall and allows the trailing tooth to remove any burrs formed by the first tooth and provide a shallow chamfer configuration to the kerf to facilitate mounting of the severed tube sections in chamfered seats in the header of an associated condenser.

BRIEF DESCRIPTION OF THE DRAWINGS

FIG. 3 is a top view of the apparatus of FIG. 2;

FIG. 4 is an end view of the apparatus of FIG. 1 taken on line 4—4 of FIG. 1;

FIG. 8 is a detail end view of a broaching knife;

FIGS. 9 and 10 are detail views showing the cutting operation at the severing station; and FIGS. 11 and 12 are detail views showing the configuration of the severed edge of the tubular stock following the severing operation.

DETAILED DESCRIPTION OF THE PREFERRED EMBODIMENT

Figure 1:
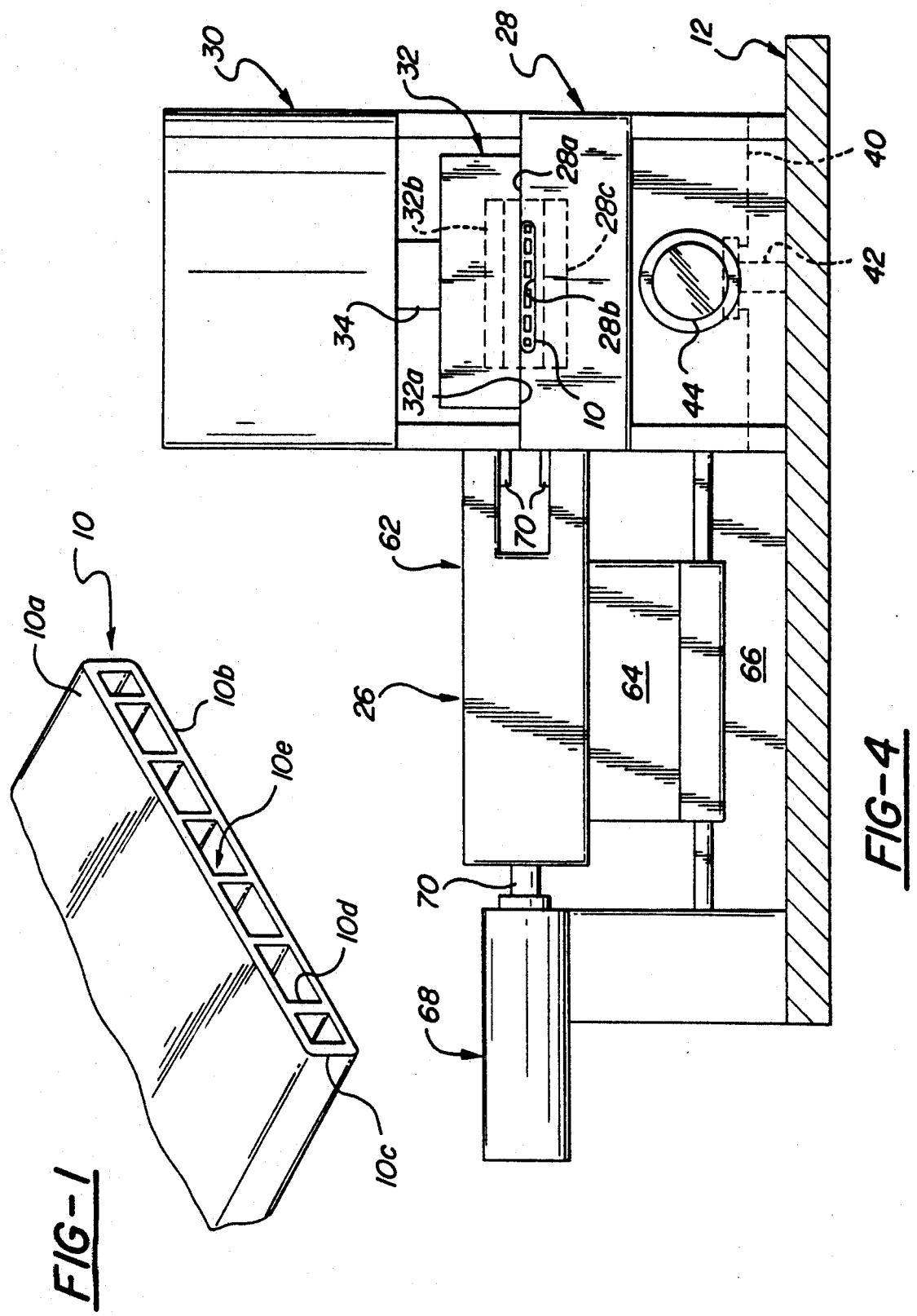
FIG. 1 is a fragmentary perspective view of a flat multi-ported tubular stock.

The invention method and apparatus is especially suitable for severing flat aluminum tubing of the type seen in FIG. 1 and including upper and lower flat horizontal walls 10a and 10b, vertical edge walls 10c, and vertical partitions 10d spaced between the end edge walls and interconnecting the upper and lower walls to divide the tube into a series of parallel, generally rectangular, longitudinally extending cores or passages 10e. Tubing of this type is used, for example, in forming condensers for air conditioning systems for motor vehicles. Flat aluminum tubing 10 supplied in roll form is severed to provide preselected lengths of flat tubing which are combined with the headers of the condenser to form the condenser assembly.

The invention apparatus includes a base 12, a roll stand 14 to hold a roll 16 of flat tubular stock 10, a pair of feed or drive rolls 18 adapted to engage the upper and lower walls of flat tubular stock 10 and feed the stock in the direction indicated by the arrows, a stationary clamp assembly 20, a movable clamp assembly 24, and a cross slide assembly 26.

Stationary clamp assembly 20 includes a fixed lower clamp member 28 supported on base 12, a power cylinder 30 supported on fixed lower clamp member 28, and a movable upper clamp member 32 carried by the piston rod 34 of cylinder 30 and movable into and out of clamping coaction with fixed lower clamp member 28 in response to actuation of cylinder 30 whereby to clamp or release tubular stock 10 fed therebetween. The upper face 28a of lower clamp member 28 may be provided with a sculptured recess as seen at 28b to facilitate the clamping of tubular stock 10 between face 28a and the lower face 32a of the upper clamp 32. Upper clamp 32 and lower clamp 28 also include tapered nose portions 32b and 28c proximate cross slide assembly 26.

Movable clamp assembly 24 includes a lower clamp member 40 mounted for sliding longitudinal movement on a rail 42 mounted on base 12; a hydraulic cylinder 44 positioned beneath the lower clamp member 28 of clamp assembly 20 and including a piston rod 26 connected to lower clamp member 40 of clamp assembly 24 so as to move the clamp assembly 24 in reciprocal fashion along rail 42 in response to actuation of cylinder 44; a power cylinder 48 mounted on lower clamp member 40; and an upper clamp 50 secured to the lower end of the piston rod 52 of cylinder 48 whereby the upper clamp 50 may be moved into and out of clamping relation with lower clamp 40 in response to actuation of cylinder 48 to clamp or release tubular stock 10 fed therebetween. Upper clamp 50 and lower clamp 40 also each include a tapered nose portion 50a and 40a corresponding generally in size and configuration to the nose portions 32b and 28c of lower clamp members 28 and 32.

It will be understood that the upper faces of nose portion 28c, nose portion 40a, and lower clamp member 40 are provided with a sculptured recess corresponding to the recess 28b in the upper face of clamp member 28.

It will be seen that the forward end edges of nose portions 32b and 28c are spaced from the rearward edges of nose portions 50a and 40a to define a severing station 60 between the spaced nose portions.

Cross slide assembly 26 includes a cross slide 62, a bracket 64 mounting the cross slide for sliding movement in a direction transverse to the longitudinal feed path of the tubular stock 10 along a track 66 positioned on the upper face of base 12, and a power cylinder 68 mounted on base 12 and including a piston rod 70 engaging cross slide 62 so that the cross slide is moved in a direction transverse to the feed path of the tube stock in response to actuation of cylinder 68.

Cross slide 62 includes a main body portion 62a and a yoke portion 62b including spaced upper and lower arm portions 62c and 62d. A broaching knife 70 is suitably mounted on each arm 62c, 62d (as for example by bolts 72) with the knives confronting but spaced from each other as best see in FIG. 7.

Each broaching knife 70 includes a main body portion 70a for mounting in the respective arm 62c, 62d of the cross slide, a leading tooth 70b, and a trailing tooth 70c. Leading tooth 70b presents a narrow V-shaped profile and may for example have an included angle α of 42°. Trailing tooth 70c has a shallow wide V-shaped profile and may for example have an included angle β of 120°. The extreme lower edge of tooth 70b is preferably spaced somewhat below the extreme lower edge of tooth 70c. For example, the lower edge of tooth 70b may be spaced 0.0070 inches below the lower edge of tooth 70c. The front or leading edge of tooth 70b is cut away at 70d to facilitate chip curling and chip removal; the area 70e between tooth 70b and tooth 70c is cut away to further facilitate chip curling and chip removal; and the area 70f rearwardly of tooth 70c is relieved to further facilitate chip curling and chip removal.

Figure 7:
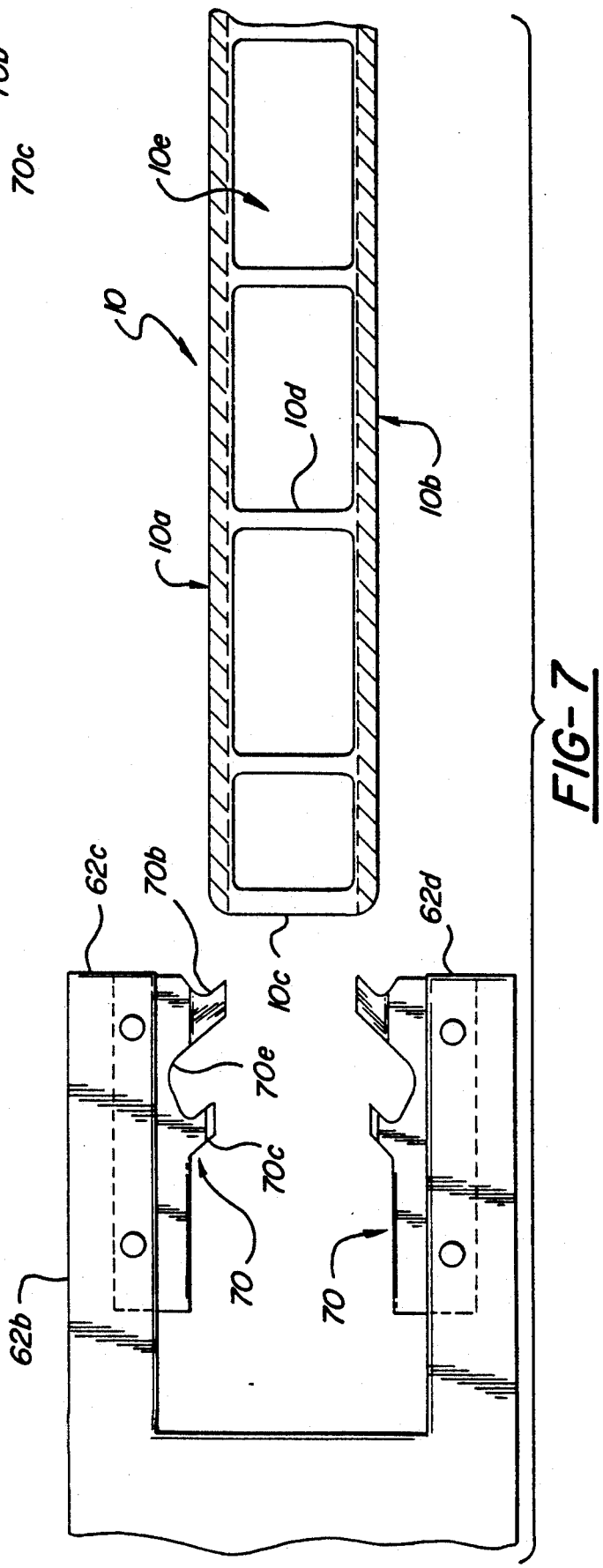
FIG. 7 is a detail view showing the interaction of the slide, the broaching knives, and the tubular stock at a severing station.

In the operation of the invention apparatus (with upper clamps 32 and 50 raised by suitable actuation of cylinders 30 and 48 and cross slide 62 in the withdrawn position seen in FIGS. 4 and 7), flat tube stock 10 is fed from roll 16 by feed rollers 18 and moves along a longitudinal feed path defined along the upper face of lower clamp 28 and the upper face of lower clamp 40 until the leading end 10a of the tube stock reaches a preselected position, as determined by a preselected number of rotations of feed rollers 18 corresponding to a preselected length of tube stock to be severed, whereafter cylinders 30 and 48 are actuated to lower clamps 32 and 50 to clampingly secure the tube stock at opposite sides of the severing station 60. Cross slide 62 is thereafter moved transversely across the feed path of the tube stock by suitable actuation of cylinder 68.

As the cross slide 62 moves forwardly from its rest position, as seen in FIG. 7, teeth 70b of the upper and lower knives 70 engage the upper and lower walls 10a and 10b of the tube stock and, as the cross slide is moved across the feed path of the tube stock, remove tube material to form a narrow, generally V-shaped narrow angle kerf 80 in the upper and lower walls 10a and 10b of the tube stock. The following or trailing teeth 70c remove further tube material and act to widen the respective kerfs formed by the teeth 70b to provide a wide, generally V-shaped wide angle kerf 82 in the upper and lower tube walls. As the trailing teeth 70c follow up on the initial cutting action of the leading teeth 70b to form the wider final kerf 82, the burr 10g formed by the leading tooth is removed and a shallow, wide angle kerf 82, is formed which is free of burrs and which has an angle or chamfer corresponding to the chamfer of the seat in which the severed tube section will be received in the header of the condenser in which the severed tube section will be incorporated. The manner in which teeth 70b and 70c coact to remove tube material to form the kerfs, and the specific manner in which the chip curls 84 and 86 formed by the teeth 70b and 70c respectively are removed, is best seen in FIG. 10.

Figure 2:
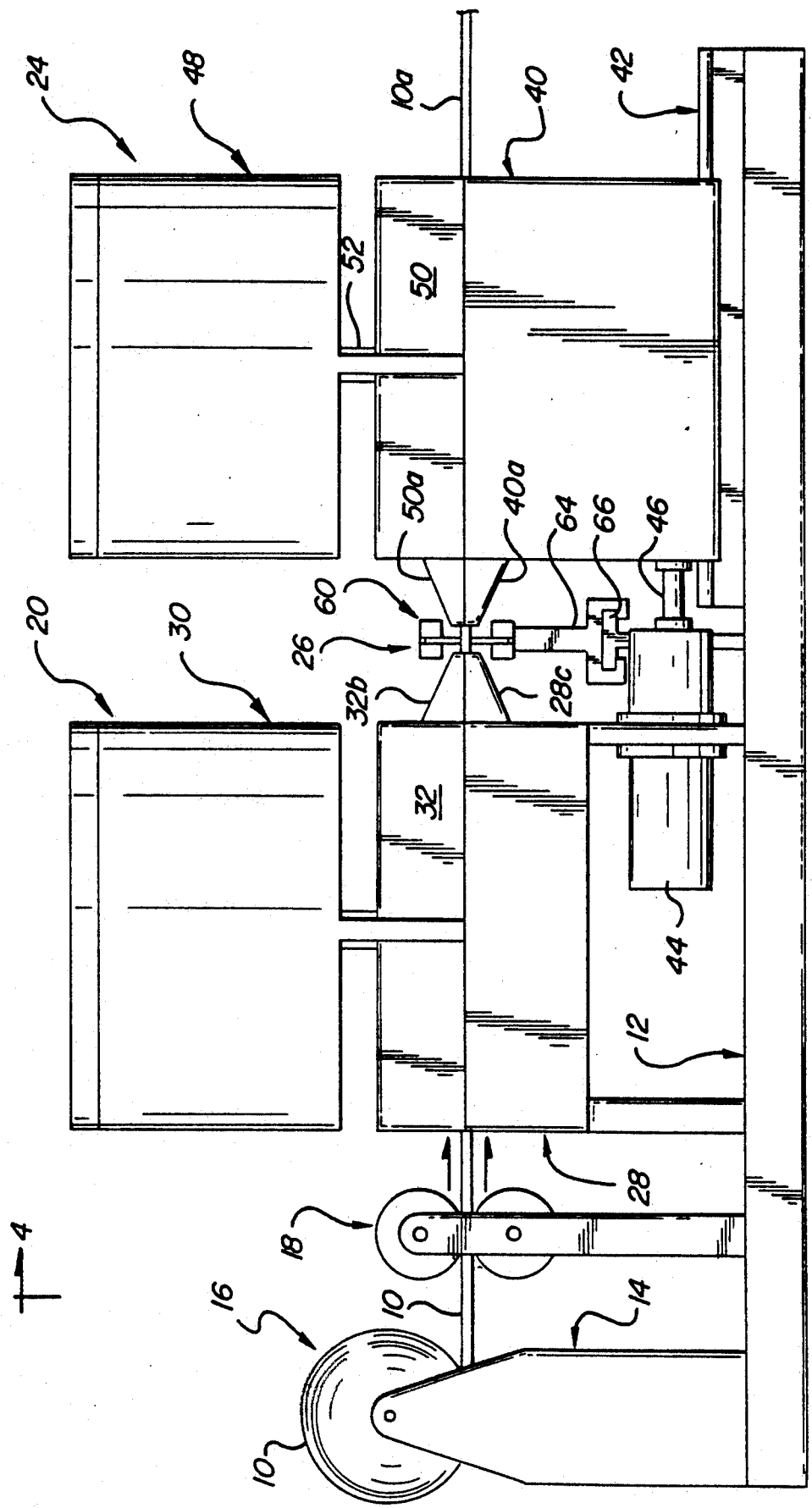
FIG. 2 is a side elevational view of a tube cutting apparatus according to the invention especially suited for cutting the tubular stock of FIG. 1.
Figure 6:
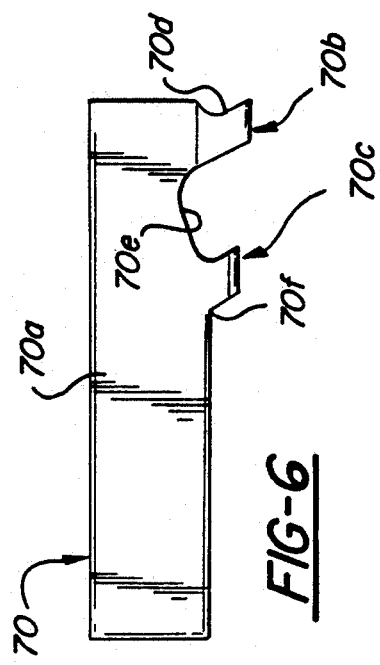
FIG. 6 is a detail view of a broaching knife employed in the invention cutting apparatus.
Figure 5:
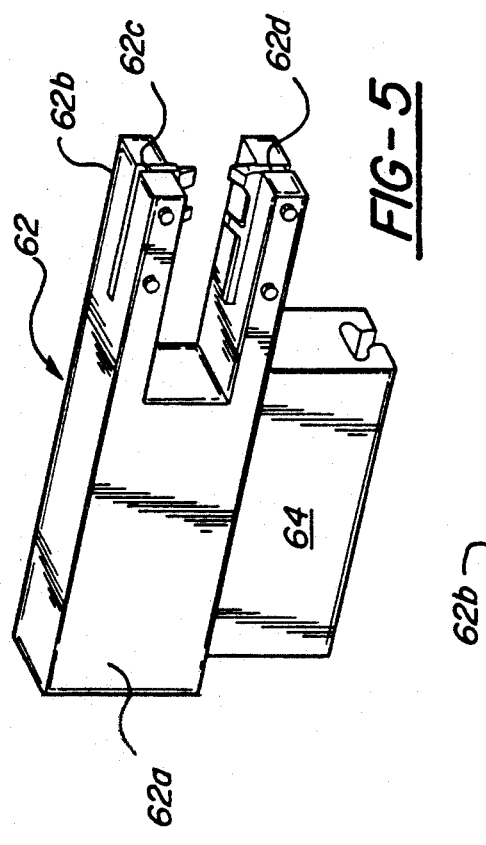
FIG. 5 is a perspective view of a slide employed in the invention cutting apparatus.

After the cross slide has moved across the tube stock, the cylinder 68 is actuated in a sense to return the cross slide to its rest position of FIG. 7 whereafter cylinder 44 is actuated in a sense to move clamp assembly 24 forwardly or to the right as viewed in FIG. 2 so as to exert a relative pulling force on the tube at opposite sides of the weakened portion formed by the kerfs 82, whereby to tear apart the remaining tube material in the plane of the kerfs and sever the tube. The severed section is thereafter removed from the apparatus and the apparatus is prepared for the next successive severing operation.

As previously indicated, the depth of the kerfs 80 and 82 is preferably only slightly less than the thickness of the walls 10a and 10b of the tube stock so that, after the removal of tube material by the broaching knives to form the kerfs, only a small amount of tube material in the upper and lower walls 10a and 10b remains to be severed by the pulling or tearing operation. For example, for a tube wall having a thickness of 0.014 inches, the depth of kerfs 80 and 82 may approximate 0.012 inches. Since only a small amount of material is severed or torn in the pulling operation, only very minor burr formations are created at the severed edge of the tube and the passageways 10e remain totally intact with virtually no distortion or deformation from their original rectangular shape.

The configuration of the severed edge of the tube is best seen in FIGS. 11 and 12 wherein virtually no burr formations occur along the top and bottom walls 10a and 10b and only minor burr formations occur at the partition walls 10d. It has been found that the burr formations left by the invention apparatus and methodology do not interfere with the installation of the severed tube sections in the associated condenser assembly so that no further finishing or resizing operation is required following the severing operation. It will also be seen (FIG. 12) that the chamfered surfaces 10h created by the shallow angle teeth 70c correspond to the chamfer of seats defined by the header 90 of the associated condenser into which the ends of the severed tube sections are positioned to form the condenser assembly.

The invention method and apparatus will thus be seen to provide a flat tube severing technique which requires no subsequent finishing or resizing operations and which provides a chamfered surface on the severed edge of the tube section to facilitate the subsequent assembly of the tube sections into the final condenser assembly.

Whereas a preferred embodiment of the invention has been illustrated and described in detail it will be apparent that various changes may be made in the disclosed embodiment without department from the scope or spirit of the invention.

We claim:

1. A method of severing an elongated tube comprising the steps of forming a first transverse kerf in one side of the tube, forming a second transverse kerf, lying in a common transverse plane with said first kerf, in an opposite side of the tube, and exerting a relatively pulling force on the tube sections on opposite sides of the transverse plane to tear apart the remaining tube material at the plane and severe the tube, characterized in that each kerf has a depth slightly less than the thickness of the wall of the tube, and the kerfs are formed in a broaching operation comprising a first cut in which a generally V-shaped narrow angle kerf is formed and a second cut in which the kerf is widened to provide a wide generally V-shaped wide angle cut.

2. A method according to claim 1 wherein the first narrow angle kerf is an acute angle kerf and the second wide angle kerf is an obtuse angle kerf.

3. A method of severing an elongated flat metal tube having upper and lower flat horizontal walls, vertical edge walls, and vertical partition walls spaced between the edge walls and interconnecting the upper and lower walls to divide the tube into a series of parallel longitudinally extending passages, characterized in that material is removed from the upper face of the upper wall to form a transverse kerf in the upper wall lying in a transverse plane, further material is removed from the lower face of the lower wall to form a transverse kerf in the lower wall lying in the transverse plane, and a relative pulling force is exerted on the tube sections on opposite sides of the plane to tear apart the tube material remaining at the plane after the material removal to form the kerfs and sever the tube.

4. A method according to claim 3 wherein the two kerfs are formed simultaneously and the pulling force is exerted after the kerfs have been formed.

5. A method according to claim 3 wherein each kerf has a depth slightly less than the thickness of the respective upper and lower wall so as to leave a small amount of solid tube material between the bottom of the kerf and the adjacent wall surfaces of the passages.

6. A method according to claim 5 wherein the kerfs are formed in a broaching operation.

7. A method according to claim 6 wherein the broaching operation comprises a first cut in which a narrow generally V-shaped narrow angle kerf is formed and a second cut in which the kerf is widened to provide a wide generally V-shaped wide angle kerf.

8. A method according to claim 7 wherein the first narrow angle cut is an acute angle and the second wide angle cut is an obtuse angle.

9. A method of severing an elongated flat metal tube having upper and lower flat horizontal walls, vertical edge walls, and vertical partition walls spaced between the end edge walls and interconnecting the upper and lower walls to divide the tube into a series of parallel, longitudinally extending passages, characterized in that the tube is fed along a longitudinal feed path to position a portion of the tube at a severing station, a first clamp is engaged with the tube at one side of the severing station, a second clamp is engaged with the tube at the other side of the severing station leaving a length of tubing exposed between the clamps at the severing stations material is thereafter removed from the upper face of the upper wall and from the lower face of the lower wall to form transverse kerfs in the upper and lower walls of the exposed length of tube at the severing station, and the first and second clamps are moved longitudinally apart to tear apart the tube material remaining between the kerfs and sever the tube.

10. A method according to claim 9 wherein each kerf has a depth slightly less than the thickness of the respective upper and lower wall so as to leave a small amount of solid tube material between the bottom of the kerfs and the adjacent wall surfaces of the passages.

11. A method according to claim 10 wherein the kerfs are formed in a broaching operation.

12. A method according to claim 11 wherein the broaching operation comprises a first cut in which a narrow generally V-shaped narrow angle kerf is formed and a second cut in which the kerf is widened to provide a wide generally V-shaped wide angle cut.

13. A method according to claim 12 wherein the first narrow angle cut is an acute angle and the second wide angle cut is an obtuse angle.

* * * * *

UNITED STATES PATENT AND TRADEMARK OFFICE
CERTIFICATE OF CORRECTION

PATENT NO. : 5,249,345
DATED : October 5, 1993
INVENTOR(S) : Milan Virsik, Henry McCarbery It is certified that error appears in the above-indentified patent and that said Letters Patent is hereby corrected as shown below:

Title page, References Cited, Please delete "3,759,627" and insert -- 3,757,627 --.

Column 7, Line 21, Before "is" insert -- which--.

Signed and Sealed this

Tenth Day of May, 1994

Attest:

BRUCE LEHMAN

*Attesting Officer*  *Commissioner of Patents and Trademarks*